Oct. 29, 1968
J. R. McWHIRTER
3,408,051
COLUMN MIXING APPARATUS
Filed Feb. 23, 1966
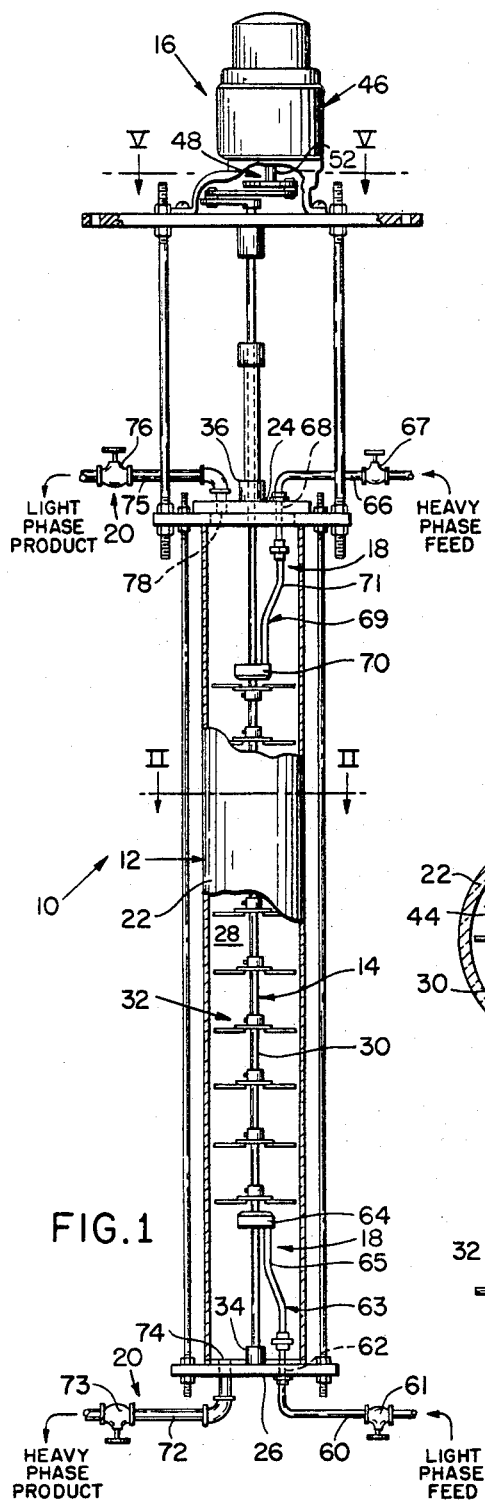
FIG.1
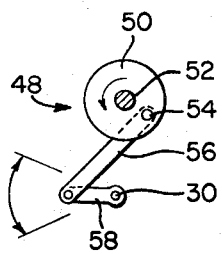
FIG.5
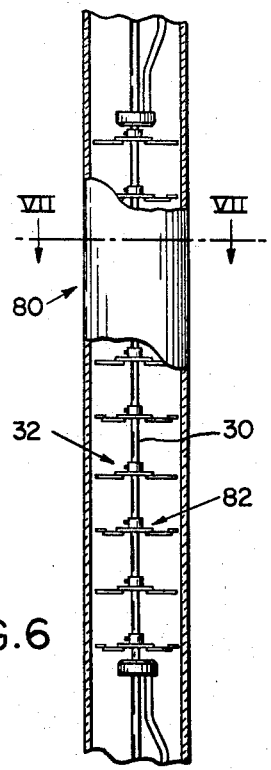
FIG.6
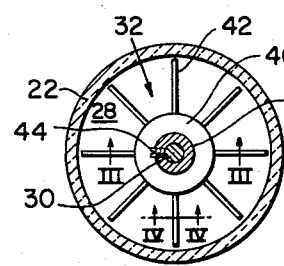
FIG.2
FIG.4
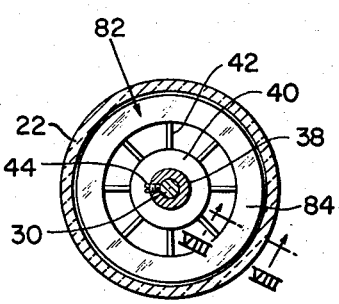
FIG.7
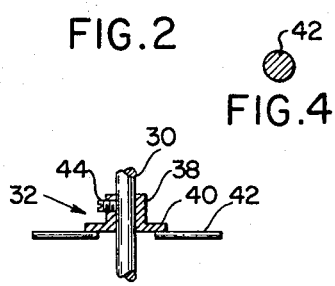
FIG.3
FIG.8
INVENTOR.
JOHN R. McWHIRTER
BY Cumpston + Shaw
ATTORNEYS

United States Patent Office 3,408,051
Patented Oct. 29, 1968

3,408,051
COLUMN MIXING APPARATUS
John R. McWhirter, Pittsford, N.Y., assignor to Mixing Equipment Co. Inc., Rochester, N.Y., a corporation of New York
Filed Feb. 23, 1966, Ser. No. 529,491
10 Claims. (Cl. 259—4)

ABSTRACT OF THE DISCLOSURE

A vertical, cylindrical column with fluid inlets and outlets has an axial shaft with a plurality of axially spaced, plane shearing units, and the shaft is driven reciprocally through an arc for sweeping the plane shearing units reciprocally for staging and contacting in the column. Each plane shearing unit comprises several rods arranged in radial symmetry around the drive shaft to leave at least 30 percent of the cross section of the column open for the passage of fluid. Also, central or peripheral baffles are arranged on plane shearing units as necessary to eliminate any fixed baffles on the interior of the column.

---

This invention resides in the art of mixing. More particularly, it relates to column mixing apparatus.

Column mixing apparatus, also referred to as column contactors, or simply as contactors, are useful in the treatment of material in a fluid medium under continuous flow conditions. Such an apparatus usually comprises a cylindrical column, the axis of which is normally vertical, with fluid feed means and fluid discharge means arranged in the end regions of the column for either cocurrent or countercurrent flow of two or more materials, at least one of which is fluid.

Heretofore, the column has been axially divided by transverse partitions or baffles into a plurality of compartments or stages with fluid flow passageways being provided between them. Generally, each compartment or stage is provided with a mixer or agitator. In one specific apparatus, the mixer comprises a flat blade turbine impeller attached to a rotatable shaft on the axis of the column. In this specific apparatus, axially aligned, stationary, peripheral baffling also is usually provided to minimize swirling in the compartments or stages. In another specific multistage column mixer apparatus, the mixer is a transverse disk carried by a rotatable shaft on the axis of the column.

In column mixing apparatus in general and the two specific apparatuses in particular there is a need for improvement of the mixing action.

An object of this invention is to provide such an improvement.

A particular object of this invention is to provide a column mixing apparatus with improved mixing means.

Still another object of this invention is to provide a column mixing apparatus of improved structure which is economical to make and to operate.

These and other objects which may appear as this specification proceeds are achieved by this invention.

This invention, in summary, comprises a column mixing apparatus wherein mixing action in at least one stage is effected by shear forces and the like applied in, and largely confined to, a cross section of the column. The cross section is so thin axially that it approaches a plane. Hence, the generator of these forces is referred to herein as a plane shearing unit. The mixing action of this invention is the result of the structure of the plane shearing unit and its operation by reciprocal rotation.

Broadly, the column mixing apparatus of this invention comprises means forming a chamber having a longitudinal axis and two ends with fluid feed means at least in the region of one end of the chamber and fluid discharge means at least in the region of the opposite end of the chamber. The longitudinal axis under the broad concepts of this invention can be curved as in the case where the chamber is formed by a curved conduit, and it can be straight. Within the chamber and carried by a reciprocatingly rotatable shaft on an axis of rotation is at least one plane shearing unit.

It is within the broader concepts of this invention for this axis of rotation to be laterally spaced from the longitudinal axis. For example, in one embodiment of this invention each stage may have two or more side by side plane shearing units with the axes of rotation parallel to one another and to the longitudinal axis. It also is within the broader concepts of this invention for the axis of rotation to intersect the longitudinal axis as when, for example, the longitudinal axis is curved. In preferred embodiments of this invention, however, the longitudinal axis is generally straight and the axis of rotation of the plane shearing unit coincides with it.

The plane shearing unit comprises a slender arm disposed transversely relative to the axis of rotation of the unit. The arm is referred to herein as a shearing element. In preferred embodiments of this invention the shearing element is a rod disposed radially relative to the axis of rotation of the unit and having a high length to axial width ratio. A preferred range of length to axial width ratios is from about ten to about fifty. Higher and lower ratios are within the broader concepts of this invention, however. The shearing element has a cross sectional shape selected and arranged to result in a minimum of axial pumping action under normal operative conditions. Preferred cross sectional shapes include circular, rectangular, triangular and the like.

The column mixing apparatus of this invention also comprises means for reciprocatingly rotating the rotatable shaft, the arc of rotation and frequency of reciprocation or oscillation being selected in accordance with the number of shearing elements in the shearing unit, the materials being mixed in the chamber and the results desired. Preferably the arc of rotation is selected so that when the rotatable shaft turns in one direction from the beginning to the end of the arc of rotation, substantially the entire cross sectional area bounded by a circle having the maximum radius of the shearing unit and in the radial plane of the shearing unit is swept or acted upon by the shearing unit. Preferably the frequency of reciprocation is selected so that the desired degree of dispersion of the discontinuous phase or phases in the continuous phase or phases in the chamber is achieved in the region of the shearing unit.

In preferred embodiments of the column mixing apparatus of this invention the longitudinal axis of the chamber is an axis of radial symmetry, which means that in any plane perpendicular to the longitudinal axis the inside periphery of the chamber is round. Generally in these embodiments the longitudinal axis is straight and normally vertically disposed, and the chamber is elongated and tubular, cylindrical being the usual shape. In these embodiments the reciprocatingly rotatable shaft is disposed on the longitudinal axis. Moreover, in these embodiments the ratio of the maximum radius of the plane shearing unit to the inside radius of the periphery of the chamber in the radial plane of the shearing unit is generally in a range from about 0.6 to about 0.99 and preferably in a range from about 0.8 to about 0.95, although higher and lower ratios are within the scope of the broader aspects of this invention.

In preferred embodiments of this invention the plane shearing unit comprises a plurality of shearing elements, all substantially in the same radial plane and all extending to the region of the inner periphery of the chamber.

In these embodiments the circumferential spacing between adjacent shearing elements is preferably substantially equal to 360° divided by the number of shearing elements. Furthermore, in preferred embodiments of this invention the shaft carries a number of plane shearing units at vertically spaced intervals. In these embodiments, preferably the arc of rotation of the rotatable shaft is at least substantially equal to 360° divided by the number of shearing elements in the plane shearing unit having the least number of shearing elements. Usually, however, the same number of shearing elements are present in the shearing units in any one column and the arc of rotation can be such that a stationary radial line in the plane of any one shearing unit is crossed several times by shearing elements in a half cycle of operation, that is, in turning the shaft in one direction of rotation from the beginning to the end of the arc of rotation whereat the direction of rotation is reversed. The arc of rotation under such circumstances is usually in a range from about 30° to about 90°, although higher and lower arcs are within the broader concepts of this invention.

In these embodiments, the frequency of reciprocation is generally in a range from about 30 to 300 cycles per minute. However, higher and lower frequencies are within the broader concepts of this invention.

The axial spacing of the plane shearing units is interrelated with such factors as the number of shearing elements, the frequency of rotation, the ease of dispersing one phase in the other, reaction rate, if one be involved, absorption or solution rate, if either one or both be involved, flow rates and the like. For easily dispersed materials, when the frequency of reciprocation is relatively low, the plane shearing units can be placed closer together than when the frequency of reciprocation is relatively high. Satisfactory results have been obtained with the ratio of the axial distance between planes of adjacent shearing units to the inside diameter of the column in cylindrical column embodiments generally in a range from about 0.2 to about 0.7. Higher and lower ratios are within the broader concepts of this invention, however.

The apparatus of this invention has utility in countercurrent as well as cocurrent contacting processes involving at least one fluid and material selected from the group consisting of liquid, gaseous and finely divided solid materials. For example, the mixing apparatus of this invention is useful for solvent extraction and especially for liquid-liquid extraction. It is useful for washing solid, gaseous and/or liquid material with a wash liquid, for dissolving solid, gaseous and/or liquid material in a liquid solvent therefor, and for carrying out chemical reactions.

Under normal operative conditions the back and forth motion of each shearing element produces a very high degree of shear and turbulence. The high shear and turbulence result from the large differences in relative velocities of the shearing element and surrounding fluid, whch differences are created by the high accelerations and decelerations of the shearing element in going through the reciprocating or oscillatory motion. This shear and turbulence produces good dispersion and resulting contact of the different phases. Moreover, the shear and turbulence are localized in an axially narrow, cross sectional zone, making them intense. This is because of the relatively low, net, bulk flow or pumping of fluid by each shearing unit. As a result, fluid interaction between adjacent shearing units is relatively low. Consequently, good dispersing and contacting are obtained simultaneously with good staging and low axial mixing of different phases between adjacent shearing units. Hence, in the apparatus of this invention there is obtained a high degree of overall mass transfer in the case of extraction and absorption, and good conversion in the case of chemical reaction.

Under some circumstances in liquid-liquid and gas-liquid contacting there is a significant tendency for the lighter phase to flow along the column axis. A reason for this is the slight centrifuging effect of the shearing elements of the shearing units. Under these circumstances, embodiments of this invention are provided with central, annular baffles mounted on the rotatable shaft and preferably they are a part of the shearing units. In preferred embodiments wherein the central baffles are part of the shearing units, the outside radius of each central baffle is substantially less than the maximum radius of the shearing unit to which the baffle relates. In this regard the central baffles function as deflectors. They do not substantially effect contacting, but function to deflect flow away from the axis of the column and into the more effective zone of action of the reciprocatingly rotating shearing elements. In general, therefore, the outside radius of each central baffle is in a range from about one fourth to about three-fourths the radius of the shearing unit to which it relates, although greater and smaller outside radii are within the broader concepts of this invention.

In preferred embodiments of the apparatus of this invention, there are no staging and swirl minimizing baffles. The superior mixing action of the apparatus of this invention does not normally require the use of these baffles.

However, under some conditions, as when the phase ratio of two fluid materials being contacted in the apparatus is vastly different from one, optimum results are obtained by the use of staging or compartment baffling in conjunction with the reciprocatingly rotatable shearing unit of this invention. Compartment baffling increases the holdup of the dispersed phase and substantially decreases axial flow. However, the axial dimension of each compartment and the width of each compartment baffle in the apparatus of this invention are generally substantially smaller than in prior art multistage column mixing apparatus under comparable conditions. The smaller axial dimension allows increased staging and improved mixing per unit of axial length of a column. In general the inside radius of the compartment baffle is in a range from about one fourth to about three fourths the inside radius of the column. In some embodiments where compartment baffling is employed, the baffling is stationary in that it is fastened to, or part of, the shell which forms the column. In other, preferred, embodiments, however, each compartment baffle is fastened to the rotatable shaft and preferably is part of a plane shearing unit. This construction is perfectly feasible with reciprocal mixing action because of the relatively slow operation of each shearing unit as compared to the relatively fast operation of the continuously rotating impellers of the prior art contactors. Because of the relatively slow oscillatory motion of the shearing units with which the compartment baffles are associated, the baffles have little or no mixing or dispersing effect and, consequently, they function in the same way as stationary baffles or partitions. An advantage of mounting the compartment baffles on the rotatable shaft is that such is less expensive than mounting them on the shell forming the column. Another advantage resides in the ease of maintenance (for example, cleaning) and repair of the apparatus.

This invention is further illustrated by the drawing which forms a material part of these disclosures.

In the drawing:

FIG. 1 is a front view of a preferred, specific embodiment of a multistage column mixing apparatus of this invention, in which view portions of outer structure have been removed to reveal inner structure;

FIG. 2 is an enlarged, sectional view taken as indicated by the sectioning plane II—II in FIG. 1 and showing in top plan view a preferred, specific embodiment of a plane shearing unit of this invention;

FIG. 3 is a side view taken as indicated by the sectioning plane III—III in FIG. 2 and showing in greater detail a portion of the shearing unit of FIG. 2;

FIG. 4 is a cross-sectional view of one of the plane shearing elements in the specific shearing unit of FIG. 2, which view has been taken as indicated by the sectioning plane IV—IV of FIG. 2.

FIG. 5 is a view of the drive means in the embodiment of FIG. 1, which shows mechanism for converting continuous rotational motion into reciprocating or oscillatory motion;

FIG. 6 is a front view of the mixer column portion of another preferred, specific embodiment of a multistage column mixer apparatus according to this invention;

FIG. 7 is an enlarged sectional view taken as indicated by the sectioning plane VII—VII of FIG. 6 and showing in top plan view a preferred, specific embodiment of another plane shearing unit of this invention; and FIG. 8 is a cross sectional view of a portion of the specific shearing unit of FIG. 7, which view has been taken as indicated by the sectioning plane VII—VII of FIG. 7.

Structure

In greater detail, FIG. 1 of the drawing illustrates a a specific, multistage column mixer apparatus 10 according to this invention. The apparatus 10 comprises a mixing column 12. Within the mixing column 12 is a multistage mixer 14 while outside of the mixing column are means 16 for reciprocatingly turning on its axis the multistage mixer 14. The mixing column 12 has feed means 18 and product discharge means 20.

The mixing column 12 comprises a cylindrical shell 22 with top end closure means 24 and bottom end closure means 26. The shell 22 and end closure means 24 and 26 form an enclosed, elongated, cylindrical chamber 28 with a longitudinal axis of radial symmetry, which is normally vertical. The shell 22 in the embodiment shown is continuous from top to bottom. However, in other embodiments of this invention, it can be segmented and formed out of cylindrical sections or semicircular sections. Materials of construction employed in the shell are glass, stainless steel and the like. In the embodiment shown in FIG. 1, the shell 22 is characterized by the absence of internal, stationary, horizontal and vertical baffling. The top and bottom end closure means 24 and 26 in FIG. 1 are of conventional structure and therefore, are not described in detail herein.

The multistage mixer 14 comprises a rotatable shaft 30 and a plurality of plane shearing units 32. The rotatable shaft 30 is normally vertically disposed on the axis of the mixing column 12. It is supported by a bottom bearing assembly 34 which is part of the bottom end closure means 26. It extends normally upwardly out of the mixing column 12 through a shaft seal assembly 36 to the means 16 for reciprocatingly rotating the shaft 30. The shaft seal assembly 36 is part of the top end closure means 24.

Each plane shearing unit 32 employed in the multistage mixer 14 of this invention comprises (see FIGS. 2 and 3) a hub portion 38, a central baffle portion 40 and a plurality of shearing elements 42. The hub portion 38 and central baffle portion 40 are one integral unit with the shearing elements 42 being fastened as by weldments to one side of the central baffle portion 40. The hub portion 38 comprises a radial, threaded hole with a set screw 44 threadedly mounted therein for anchoring the plane shearing unit 32 to the rotatable shaft 30. The shearing elements 42, which in the embodiment shown are eight in number, are arranged in radially extending fashion in substantially the same radial plane on one side of the central baffle portion 40. Each shearing element 42 is circumferentially spaced from adjacent shearing elements by an arc of 45°. In the embodiment shown, the shearing elements 42 are of sufficient length so that the ratio of the maximum radius of the shearing unit 32 to the inside diameter of the mixing column 12 is about 0.9. Each shearing element 42 in the embodiment shown is characterized by being long in the radial direction and thin or slender in the axial direction. In the embodiment shown, the ratio of the maximum radius of the shearing unit 32 to the maximum, axial width of each shearing element 42 is about 30. The cross sectional shape of each shearing element 42 in the embodiment shown in FIGS. 1–3 is round (see FIG. 4). However, other cross sectional shapes which function under normal operative conditions to give substantially no liquid movement in the axial direction can be employed in this embodiment.

As hereinbefore indicated, in the embodiment of FIG. 1, the rotatable shaft 30 carries a plurality of plane shearing units 32. Indeed, there are a total of ten shearing units 32 in the embodiment shown. More or less shearing units 32, however, can be employed in this embodiment. In the embodiment shown the ratio of the axial spacing between adjacent shearing units 32 to the inside diameter of the mixing column 12 is about 0.3. However, ratios greater and smaller than this ratio can be used in this embodiment.

The means 16 for reciprocatingly rotating the rotatable shaft 30 and thus the shearing units 32 anchored thereto comprise a prime mover 46 which generates rotational motion, and a mechanism 48 for translating the rotational motion into a reciprocating motion. As best shown in FIG. 5 the motion converting mechanism 48 comprises a crank disk 50 mounted at the bottom end of the rotatable drive shaft 52 of the prime mover 46. On the normally bottom face of the drive wheel 50 is downwardly extending, wrist pin 54. Rotatably carried on the wrist pin 54 is one end of a normally horizontally disposed connecting rod 56. The other end of the connecting rod 56 is rotatably secured to a pin at one end of the crank arm 58. The other end of the crank arm 58 is anchored to the rotatable shaft 30. Rotational movement of the crank disk 50 causes the crank arm 58 and thus the rotatable shaft 30 to turn first in one direction and then in the opposite direction with one revolution of the crank disk 50 resulting in one cycle of reciprocating motion. The length of the connecting rod 56 and the length of the crank arm 58 are such as to cause the rotatable shaft 30 and thus each plane shearing unit 32 to reciprocate in a 45° arc in the embodiment shown.

The feed means 18 in the apparatus of FIG. 1 comprise a light phase feed conduit 60 with a shut off and flow rate control valve 61 therein, and a lower sparge assembly 63. The lower sparge assembly 63 comprises a sparge ring 64, the inner periphery of which is disposed about, but radially spaced from, the rotatable shaft 30 in the region of the bottom, plane shearing unit 32. In addition, the lower sparge assembly 63 comprises a lead-in conduit 65 from the sparge ring 64 to an inlet 62 in the bottom end closure means 26, to which inlet both the lead-in conduit 65 and the light phase feed conduit 60 are coupled. Although usually not necessary, the lower sparge assembly can also comprise a steady bearing structure for the rotatable shaft 30.

The feed means 18 also comprise a heavy phase feed conduit 66 with shut off and flow rate control valve 67 therein, and an upper sparge assembly 69. This assembly comprises a sparge ring 70, the inner periphery of which is disposed about, but radially spaced from, the rotatable shaft 30 in the region of the top, plane shearing unit 32 carried by the rotatable shaft 30. The upper sparge assembly 69 also comprises a lead-in conduit 71 extending from the sparge ring 70 to the heavy phase feed inlet 68 in the top end closure means 24, to which inlet both the discharge end of the heavy phase feed conduit 66 and the lead-in conduit 71 are coupled. The inner side of the sparge ring 70 also comprises a steady bearing structure (not shown) for the rotatable shaft 30. This combination of sparge ring and steady bearing structure is conventional and, therefore, is not further described herein.

The product discharge means 20 comprise a heavy phase discharge conduit 72 with a shut off and flow rate control valve 73 therein. The discharge conduit 72 is coupled to a heavy phase discharge outlet 74 in the bottom end closure means 26 of the mixing column 12. In addition, the product discharge means 20 comprise a light phase product discharge conduit 75 with a shut off and flow rate control valve 76 therein. The light phase product discharge conduit 75 is coupled to a light phase product discharge outlet 78 in the top end closure means 24. The heavy phase product discharge outlet 74 in the bottom end closure means 26 and the light phase product discharge outlet 78 in the top end closure means 24 both open into the interior of the mixing column 12.

FIGS. 6–8 illustrate a multistage column mixing apparatus 80 of substantially the same construction as the specific apparatus of FIGS. 1–5, except that the rotatable shaft 30 carries on it staging baffled, plane shearing units 82 in addition to the plane shearing units 32 of the apparatus of FIGS. 1–5. In the embodiment shown in FIG. 6, the staging baffled, plane shearing units 82 are disposed between the plane shearing units 32 which do not have the staging baffling (although they do have the central baffle portion 40). The structure of the staging baffled, plane shearing units 82 is substantially the same as the structure of the units 32 except that, as shown best in FIGS. 7 and 8, mounted on, and fastened as by weldments to, the shearing elements 42 is a substantially flat ring 84. This ring has an outside diameter sufficiently less than the inside diameter of the cylindrical chamber 28 so that the outside of the ring 84 does not touch the wall of the chamber under normal operative conditions, and has an inside diameter about twice the outside diameter of the central baffle portion 40.

*Operation*

From the legends in FIG. 1, it is evident that the specific multistage column mixer apparatus 10 is set up for countercurrent liquid-liquid extraction wherein a light phase feed liquid and a heavy phase feed liquid, which are substantially immiscible and which result in a light phase product and a heavy phase product, which are substantially immiscible, are continuously introduced into the column 12 and a light phase liquid product and a heavy phase liquid product are continuously withdrawn from the column 12.

To start up the mixing apparatus 10 (or the mixing apparatus 80) the column 12 is filled with light phase feed liquid, for example, by introducing it through the feed conduit 60. The prime mover 46 is actuated and heavy phase feed liquid is introduced by way of the heavy phase feed conduit 66 into the column 12. Both the heavy phase feed liquid and the light phase feed liquid are continuously introduced into the column 12, and a light phase product liquid is continuously withdrawn through conduit 75 and a heavy phase product liquid is continuously withdrawn via conduit 72. As a result, there is a continuous flow of heavy phase feed liquid from the sparge ring 70 downwardly through the column towards the heavy phase liquid product conduit 72 while there is a continuous flow of light phase feed liquid upwardly through the column towards the light phase liquid product withdrawal conduit 75. The reciprocating action of the radial plane shearing units 32, however, continuously disperses one of the heavy phase feed and light phase feed liquids in the other of the liquids. The absence of substantial axial pumping plus the spacing between the shearing units provides a staging effect, whereby highly efficient mass transfer from one of the feed liquids to the other feed liquid occurs. The feed liquid conduit valves 61 and 67, discharge conduit valves 73 and 76 and the rotational velocity of the prime mover 46 are adjusted for optimum dispersion within the mixing column 12.

Of interest is the fact that in employing an apparatus like that of FIGS. 1–5 in a liquid-liquid extraction it was found that in reducing the arc of rotation of the shearing units 32 from 90° to 45°, only about a 10% increase in the speed of the prime mover 46 was needed to obtain products of about the same compositions.

The mixing apparatus 10 of FIG. 1 and the mixing apparatus 80 of FIG. 6 can also be employed in the treatment of liquid-solid suspensions with a treatment fluid which can be either liquid or gaseous. Thus, referring to the mixing apparatus 10 of FIG. 1 for example, a liquid-solid suspension is introduced into the mixing column 12 by way of the heavy phase feed liquid conduit 66 (the sparge ring 70 and lead-in conduit 71 would be eliminated here) while the treatment fluid is introduced into the mixing column 12 by way of the light phase feed liquid conduit 60. The treated suspension, which after treatment, might well be a solution, is withdrawn from the mixing column 12 by way of conduit 72, while spent or residual treatment fluid, if any there be, is withdrawn by way of the light phase product liquid conduit 75. By suitable adjustment of the shut off and flow rate control valves 61, 67, 73, and 76, and adjustment of the frequency of the reciprocatory turning of the rotatable shaft 30, optimum treatment conditions are obtained.

The multistage column mixing apparatus 10 of FIG. 1 and the mixing apparatus 80 of FIG. 6 can also be employed in absorption procedures and in reaction procedures. For example, again referring to the apparatus of FIG. 1, an absorption liquid is continuously introduced into the mixing column 12 by way of conduit 66 while a gas is continuously introduced into the mixing column 12 by way of the light phase feed conduit 60. Liquid with absorbed gas is continuously withdrawn from the mixing column 12 by way of conduit 72, and residual gas, if any, is withdrawn by way of conduit 75. Again, the shut off and flow rate control valves 61, 67, 73 and 76 and the frequency of the oscillatory motion of the rotatable shaft 30 are adjusted for optimum conditions.

Thus, there is provided a multistage column mixing apparatus of improved construction and operation.

Other features, advantages and specific embodiments of this invention will be readily apparent to those in the exercise of ordinary skill in the art after reading the foregoing disclosures. Those specific embodiments are within the scope of the claimed subject matter, unless otherwise indicated. While specific embodiments of the apparatus of this invention have been described in considerable detail, variations and modifications of these embodiments can be effected without departing from the spirit and scope of the invention as disclosed and claimed.

I claim:
1. A mixing apparatus comprising:
 (a) means forming a chamber having two ends;
 (b) a shaft extending from one of said ends to the other;
 (c) fluid feed means at least in the region of one of said ends, and fluid discharge means at least in the region of the other of said ends;
 (d) a plurality of plane shearing units secured to said shaft and spaced axially along said shaft;
 (e) each of said plane shearing units comprising:
  (1) at least three rods disposed radially relative to said shaft in a single plane normal to said shaft;
  (2) said rods being arranged in radial symmetry around said shaft;
  (3) at least 30 percent of the cross section of said chamber in the plane of said plane shearing unit being open for the passage of said fluid;
 (f) each of said plane shearing units being axially spaced by at least the thickness of said rods from any structure impeding the flow of said fluid; and
 (g) means for reciprocally rotating said shaft and said plane shearing units in an arc of at least the angle between adjacent ones of said rods and less than about 360 degrees.

2. The mixing apparatus of claim 1 wherein said reciprocation is at a frequency in a range from about 30 to about 300 cycles per minute.

3. The apparatus of claim 2 wherein the ratio of the length to the maximum axial width of each of said rods is in a range from about ten to about fifty.

4. The apparatus of claim 3 wherein the ratio of the maximum radius of said rods to the radius of said chamber in the plane of each of said plane shearing units is in a range from about 0.6 to about 0.99.

5. The apparatus of claim 5 wherein at least one of is cylindrical with a vertical axis, said shaft is arranged on said vertical axis and is supported at each end of said chamber.

6. The apparatus of claim 5 wherein at least one of said plane shearing units includes at least one rotatable staging baffle secured to said rods.

7. The apparatus of claim 6 wherein said baffle comprises a central annular baffle extending from said shaft radially outward.

8. The apparatus of claim 7 wherein a second baffle comprises an annular baffle having an outside diameter slightly less than the inside diameter of said chamber and having an inside diameter substantially greater than the outside diameter of said central annular baffle.

9. The apparatus of claim 1 wherein each of said plane shearing units includes a central annular baffle extending from said shaft radially outward.

10. The apparatus of claim 1 wherein at least one of said plane shearing units includes a rotatable staging baffle secured to said rods and having an outside diameter slightly less than the inside diameter of said chamber and extending radially inward.

References Cited

UNITED STATES PATENTS

| | | | |
|---|---|---|---|
| 18,759 | 12/1857 | Miller | 259—128 |
| 2,229,238 | 1/1941 | Cash | 259—101 |
| 2,584,053 | 1/1952 | Seavey et al. | 259—4 |
| 3,013,866 | 12/1961 | Samaniego et al. | 259—8 XR |
| 3,194,638 | 7/1965 | Neuville | 259—8 XR |
| 3,248,090 | 4/1966 | Horsley et al. | 259—4 |

WALTER A. SCHEEL, *Primary Examiner.*

J. M. BELL, *Assistant Examiner.*